Patented Dec. 22, 1925.

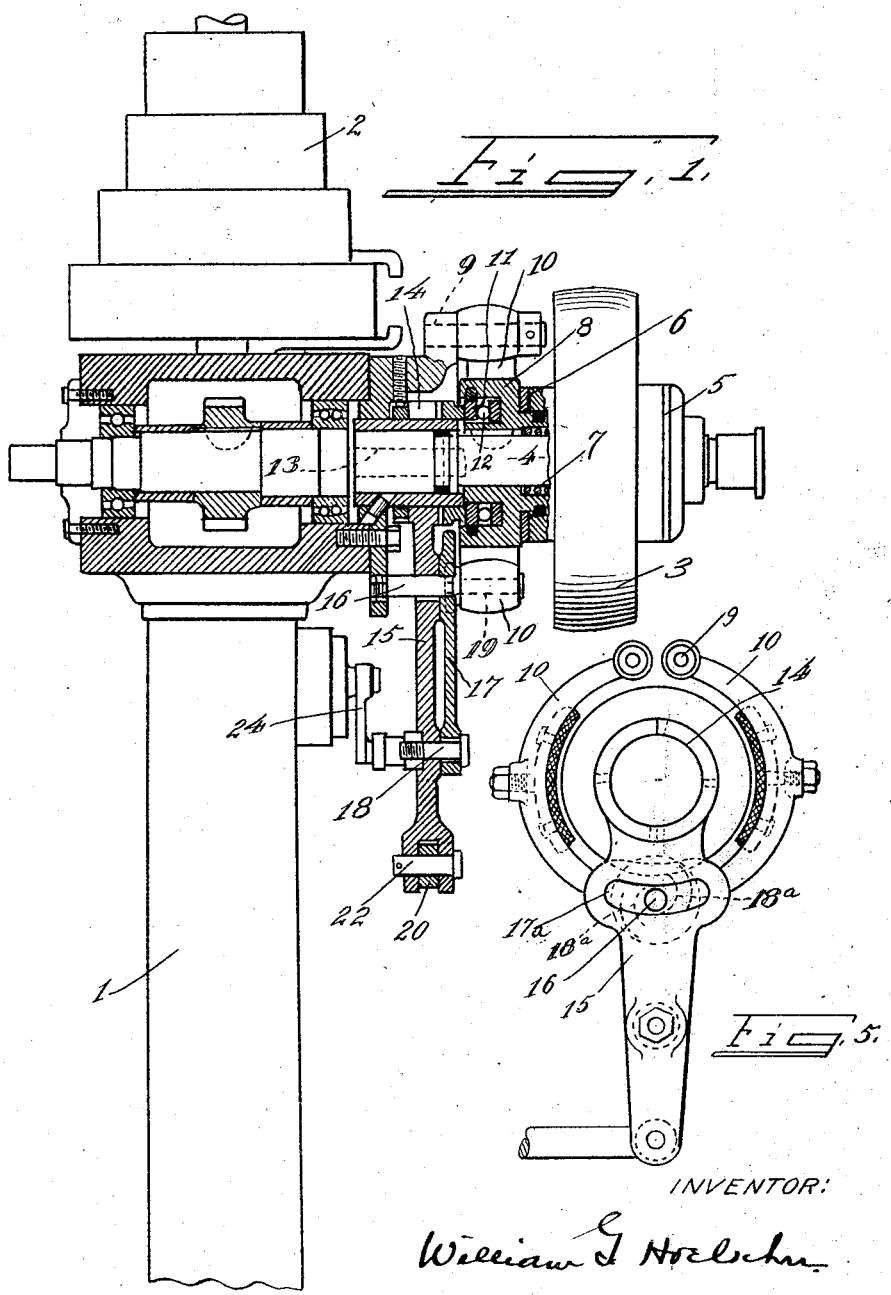

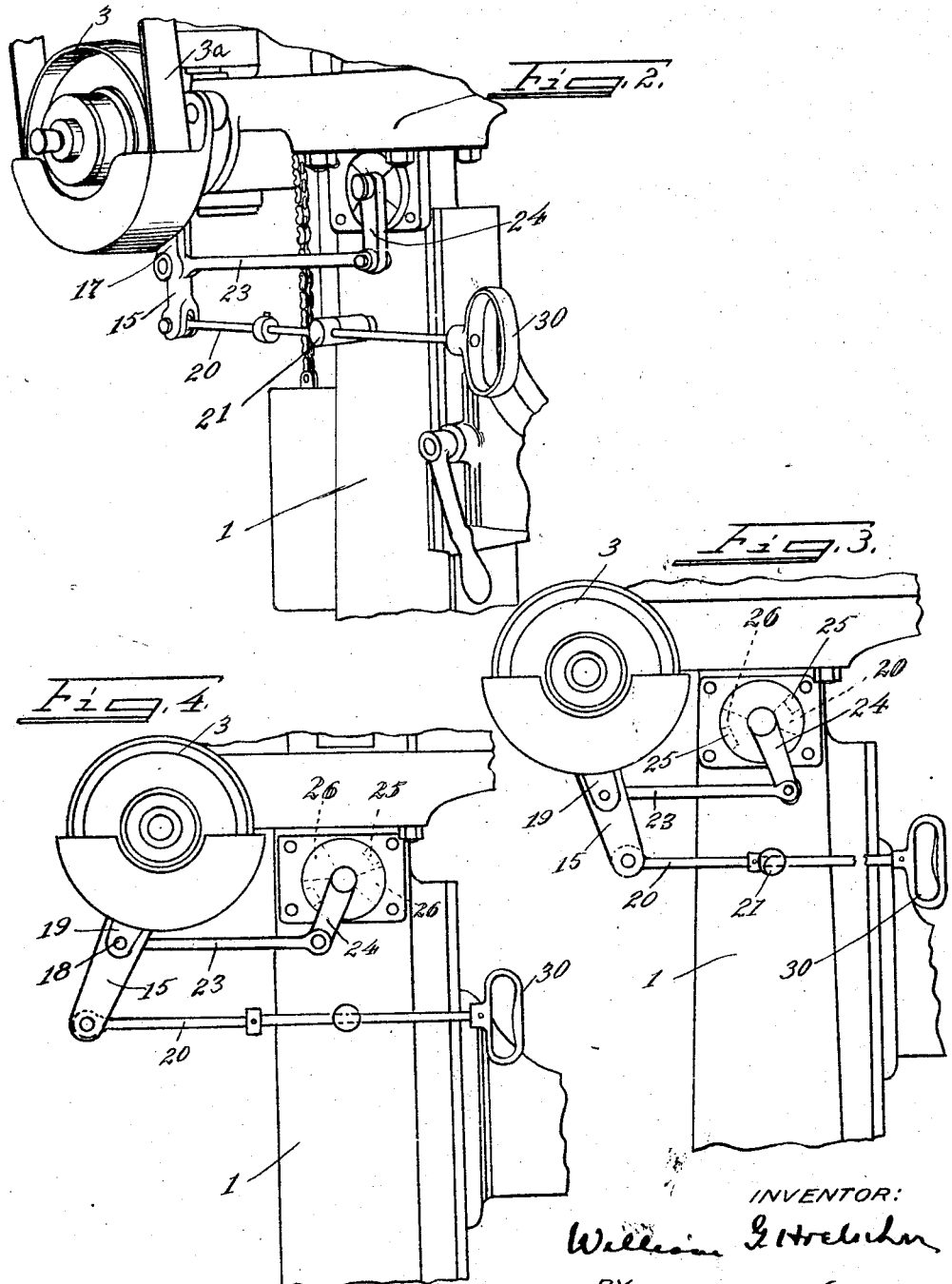

1,566,477

UNITED STATES PATENT OFFICE.

WILLIAM G. HOELSCHER, OF CINCINNATI, OHIO.

DRILLING MACHINE.

Application filed April 6, 1922. Serial No. 550,230.

*To all whom it may concern:*

Be it known that I, WILLIAM G. HOELSCHER, a citizen of the United States, and a resident of Cincinnati, in the county of Hamilton and State of Ohio, have invented certain new and useful Improvements in Drilling Machines, of which the following is a full, clear, and exact description, reference being had to the accompanying drawings, forming part of this specification.

My invention relates to drilling machines or other machine tools having a drive from an electric motor and also a clutch and brake, and to the provision of a switch, brake and clutch control from a common lever so as to permit the rapid and easy transition from stopped to full speed and from full speed to a quick and absolute stop.

The clutch and brake mechanism forming part of the structure to be hereinafter described is shown and described and claimed in my co-pending application, Serial No. 481,799, filed July 1, 1921, to which reference is hereby made.

Among the objects of my invention is the provision of a switch connected up with the clutch operating arm in such a way that the machine may be stopped and the motor permitted to run idle, and the machine started and stopped, with the motor started and stopped also, as the operator may desire, and convenience in operation dictates.

It is also my object to so place and operate the switch that it does not take any space in the machine to the exclusion of important parts, and is conveniently and inexpensively connected up with the starting lever.

These objects I accomplish by that certain construction and arrangement of parts to be hereinafter more specifically pointed out and claimed.

In the drawings,

Figure 1 is a detail section of the clutch and brake device, with portions of the machine frame in elevation.

Figure 2 is a perspective view of the switch and operating parts in position for current being applied to the motor, but the machine itself to be held against motion.

Figure 3 is a side elevation showing the parts in position for full running.

Figure 4 is a side elevation showing the parts in position to entirely stop the motion of the machine and turn off the current as well.

Figure 5 is a detail elevation of the brake and clutch operating parts disassembled from the rest of the machine and taken at right angles to Figure 1.

The machine, which happens in this instance to be a drill, is shown as having a frame 1 and a cone pulley 2, the drill shaft driving pulley not being shown in the drawings. The power is applied to a pulley 3 from some electric motor (not shown), by a belt 3ª and by means of a clutch mechanism, to be described, is transferred to a shaft 4, which by suitable gearing drives the cone pulley 2.

The shaft 4 mounts the pulley 3 idly and has fixed on its outer end a friction band or disk 5, which will press against one face of the pulley hub when the clutch devices are operated.

Another friction band or disk 6 is mounted on the shaft 4 and is spring-pressed away from engagement with the inner face of the pulley hub by means of a spring 7.

The disk 6 is mounted on a drum member 8, which is slidable but not revoluble on the shaft 4, and fixed pins or studs 9 mount a pair of brake shoes 10, which bear against the drum to act as a brake on the shaft, said shoes being adapted to be drawn together over the drum from their lower ends.

To push the drum and with it the disk 6 against the face of the pulley hub, and thus to clamp the pulley hub between the disk 6 and the disk 5, I provide a cam collar 11, which bears against a bearing 12 housed in the said drum. This collar will be supported slidably but non-rotatably on the frame of the machine independent of the shaft and of the drum, as for example by long pins 13 extending out from the machine frame and engaging wings on said collar.

Journaled over the shaft is a collar 14 having a cam face opposed to the cam collar 11, said last noted collar adapted to be revolved by a lever 15, thereby forcing over the drum and acting to clutch the pulley to the shaft.

The lever 15 is mounted over a stud 16 extending from the frame and is slotted, as at 17ª, to permit of a rocking of the collar 14, said lever and collar being preferably of one piece and fulcrumed on the shaft 4.

To operate the brake shoes, the mounting stud 16 extends beyond the lever 15 and mounts another arm 17, which has also a loose fit over a stud 18 on the lever. This arm 17 fulcrums on the stud 16 and loosely over the stud 18 when the lever 15 is rocked.

At its upper end the arm 17 has a pair of cam slots 18ª into which extend the pins 19, 19, which pins engage the lower ends of the brake shoes. As a result when the lever 15 is rocked, the clutch is operated and at the same time the brake is operated.

The cam slots are so arranged that they begin to tighten up on the brakes as the clutch is moving away from position of grasping the pulley hub, and a continued motion after the clutch has disconnected clamps the brakes tightly to hold the shaft against any movement.

For operating the lever 15 a sliding rod 20 is mounted in a stud 21 arranged on the side of the machine frame, said rod being connected to the bifurcated lower end of the lever by means of a pivot pin 22.

The stud 18 on the lever in addition to mounting the brake actuating arm also mounts an arm 23 which is connected to a lever 24, which actuates the switch.

I have not shown the interior of the switch and have merely indicated in dotted lines the contact pieces 25, 25, for the movable part of the switch and the fixed contacts 26, 26, to which the terminal posts are connected.

When the lever 24 is in a vertical position, the switch is on, but the lever 15 has not swung sufficiently to release the clutch or apply the brakes. When the lever 24 is inclined toward the operator (Figure 3) the switch is on and the brake released and the clutch in grasping position. When the lever 24 is inclined away from the operator, the clutch is out, the brake on and the switch in position of connecting up current with the motor.

In operation, beginning with the machine idle, the operator pulls the handle 30 on the rod 20 toward him, which, progressively and in the order given, connects up the switch contacts, opens the brakes and throws in the clutch. The machine quickly comes to full speed and when it is desired to stop it, but leave the motor running, the operator pushes the lever clear away from him to progressively release the clutch and apply the brakes and shut off the switch, then as soon as the machine has stopped and while the motor is still running idly he pulls the handle 30 back until the switch lever is standing vertically to close the switch again.

To couple up the machine after it is desired to start again, the operator pulls the handle toward him as far as it will go, which releases the brake and couples up the clutch.

It should be noted that the brakes are not applied to the pulley, but to the part to which the pulley is to be clutched, and hence the act of applying the brakes tends rather to insure the freeing of the pulley for idle running than to apply a brake to the motor itself. Any tendency of the clutch to stick will be jerked loose by the stopping of the machine shaft while the motor is still running and the brakes are the first thing released when starting and the last thing applied in stopping, so that the frictional quality of the clutch will always provide against undue load on the motor at the instant of starting. The current is never on while the clutch and brake are applied.

Having thus described my invention, what I claim as new and desire to secure by Letters Patent, is:—

1. In combination with a machine tool having an operating shaft, an electric switch for a driving motor, a clutch adapted to connect the motor with the operating shaft, a brake for the shaft, and means for operating the brake, clutch and switch from a common handle, for the purpose described, said means being adapted to take a position to close the switch while holding the clutch out of operation and the brake in operation.

2. In combination with a machine tool having an operating shaft, an electric switch for a driving motor, a pulley on the shaft, and belt connections from the motor thereto, a friction clutch operating on the shaft to grasp the pulley, a brake applied to the shaft, and common means for operating the brake, clutch and switch from a common handle, for purpose described.

3. In combination with a machine tool having an operating shaft, an electric switch for a driving motor, a clutch adapted to connect the motor with the operating shaft, a brake for the shaft, and means for operating the brake, clutch and switch from a common handle, for the purpose described, said means being adapted upon motion in one direction to progressively close the switch, release the brake, and operate the clutch and in the other direction to open the clutch, apply the brake and turn off the switch.

4. In combination with a machine tool having an operating shaft, an electric switch for a driving motor, a pulley on the shaft, and belt connections from the motor, a friction clutch operating on the shaft to grasp the pulley, a brake applied to the shaft, and common means for operating the brake, clutch and switch from a common handle, for the purpose described, said means being adapted upon motion in one direction to progressively close the switch, release the brake and operate the clutch, and in the other direction to open the clutch, apply the brake and turn off the switch.

WILLIAM G. HOELSCHER.